US006933251B2

(12) United States Patent
Kikuchi

(10) Patent No.: US 6,933,251 B2
(45) Date of Patent: Aug. 23, 2005

(54) FABRIC FOR WELDING

(75) Inventor: Yuzo Kikuchi, Tokyo (JP)

(73) Assignees: Kabushiki Kaisha Mathui Tape Kougyousho, Shizuoka-ken (JP); Kabushiki Kaisha Orusen, Tokyo (JP)

( * ) Notice: Subject to any disclaimer, the term of this patent is extended or adjusted under 35 U.S.C. 154(b) by 0 days.

(21) Appl. No.: 09/033,909

(22) Filed: Mar. 3, 1998

(65) Prior Publication Data

US 2001/0008822 A1 Jul. 19, 2001

(51) Int. Cl.⁷ ............................. B32B 9/00; B32B 5/08
(52) U.S. Cl. .................. 442/59; 442/218; 428/124; 428/125; 428/130; 428/152; 4/498; 12/401; 156/401.1; 156/304.1; 52/3
(58) Field of Search .................. 442/218; 128/131; 52/3; 135/115; 156/401.1, 304.1; 12/401; 428/124, 125, 130, 152; 4/498

(56) References Cited

U.S. PATENT DOCUMENTS 1,871,570 A * 8/1932 Weber .............................. 52/3
4,286,007 A * 8/1981 Oellerking .................. 428/194
5,277,966 A * 1/1994 Nakayama et al.
5,845,995 A * 12/1998 Starlinger Huemer ...... 383/125

FOREIGN PATENT DOCUMENTS

| WO | 97/49541 | * 12/1991 |
| WO | WO 97/49541 | * 12/1997 |

* cited by examiner

Primary Examiner—Glenn Caldarola
Assistant Examiner—Alex Wachtel
(74) Attorney, Agent, or Firm—Browdy and Neimark P.L.L.C.

(57) ABSTRACT

A fabric for welding is provided which has a welding portion integral with the fabric which extends partially or completely over the width of the fabric. The welding portion of the fabric comprises at least a warp or weft which melts under hot pressing to adhere the fabric to a substrate. The substrate may be a cloth sheet, a synthetic resin sheet, or the like. This enables one to attach the sheet to a column, a stake, a log, a building, a footing, etc., or to attach the welding fabric to another sheet.

11 Claims, 8 Drawing Sheets

FABRIC FOR WELDING

FIELD OF THE INVENTION

The present invention relates to a fabric which can be attached by welding to a substrate.

BACKGROUND OF THE INVENTION

Heretofore in welding fabric to a substrate, the fabric used was a belt-form fabric with a special design. As shown in FIG. 9A, at least a portion of the belt-form fabric is woven with a coarse weave. FIG. 9B illustrates how this fabric T is welded to a substrate in the form of a sheet, S. The coarsely woven portion t is sandwiched between a welding tape M and substrate S and heat-pressed so that the welding tape is melted and flows into the gaps of the coarsely woven portion t. Thus, the fabric T is united with substrate S.

Unfortunately, the conventional fabrics used for welding require that the welding tape M be correctly positioned on the coarsely woven portion of the belt-form fabric T overlapped on the welding zone of the substrate S. This correct positioning is troublesome, and requires considerable expenditure of time and labor.

SUMMARY OF THE INVENTION

It is an object of the present invention to overcome the aforementioned deficiencies of the prior art.

It is another object of the present invention to provide a fabric for welding which can easily be welded to any type of substrate that can be subjected to hot pressing.

According to the present invention, a fabric for welding is provided which has a welding portion integral with the fabric which extends partially or completely over the width of the fabric. The welding portion of the fabric comprises at least a warp or weft which melts under hot pressing to adhere the fabric to a substrate. The substrate may be a cloth sheet, a synthetic resin sheet, or the like. This enables one to attach the sheet to a column, a stake, a log, a building, a footing, etc., or to attach the welding fabric to another sheet.

DETAILED DESCRIPTION OF THE INVENTION

The fabric for welding according to the present invention can be any type of fabric, including woven or non-woven. The welding portion integral with the fabric can extend either partially or completely over the width of the fabric. The welding portion of the fabric comprises at least a warp or a weft, or both, which melts under hot pressing to adhere the fabric to a substrate. The substrate may be any substrate which can be subjected to hot pressing, such as a cloth sheet, a synthetic resin sheet, or the like.

The fabric for welding can be in the form of a belt, sheet, or any form of fabric, woven or non-woven. Where the fabric is woven, any type of weave can be used. Examples of types of weaves, which examples are solely for purposes of illustration and are not intended to be limiting, are twill weave, satin weave, plain weave, and the like. Any type of weaving machine can be used to produce the fabric The welding portion of the fabric can be any type of material which flows under hot pressing conditions to form a seal between the welding fabric and a substrate. The welding portion of the fabric may comprise warp or weft fibers coated with a thermoplastic synthetic resin, such as polyvinyl chloride, which melts under conditions of hot pressing to seal the fabric to a substrate. Alternatively, the warp or weft per se can be coated with a thermoplastic synthetic resin which melts under conditions of hot pressing to seal the fabric to a substrate.

Figure 1:
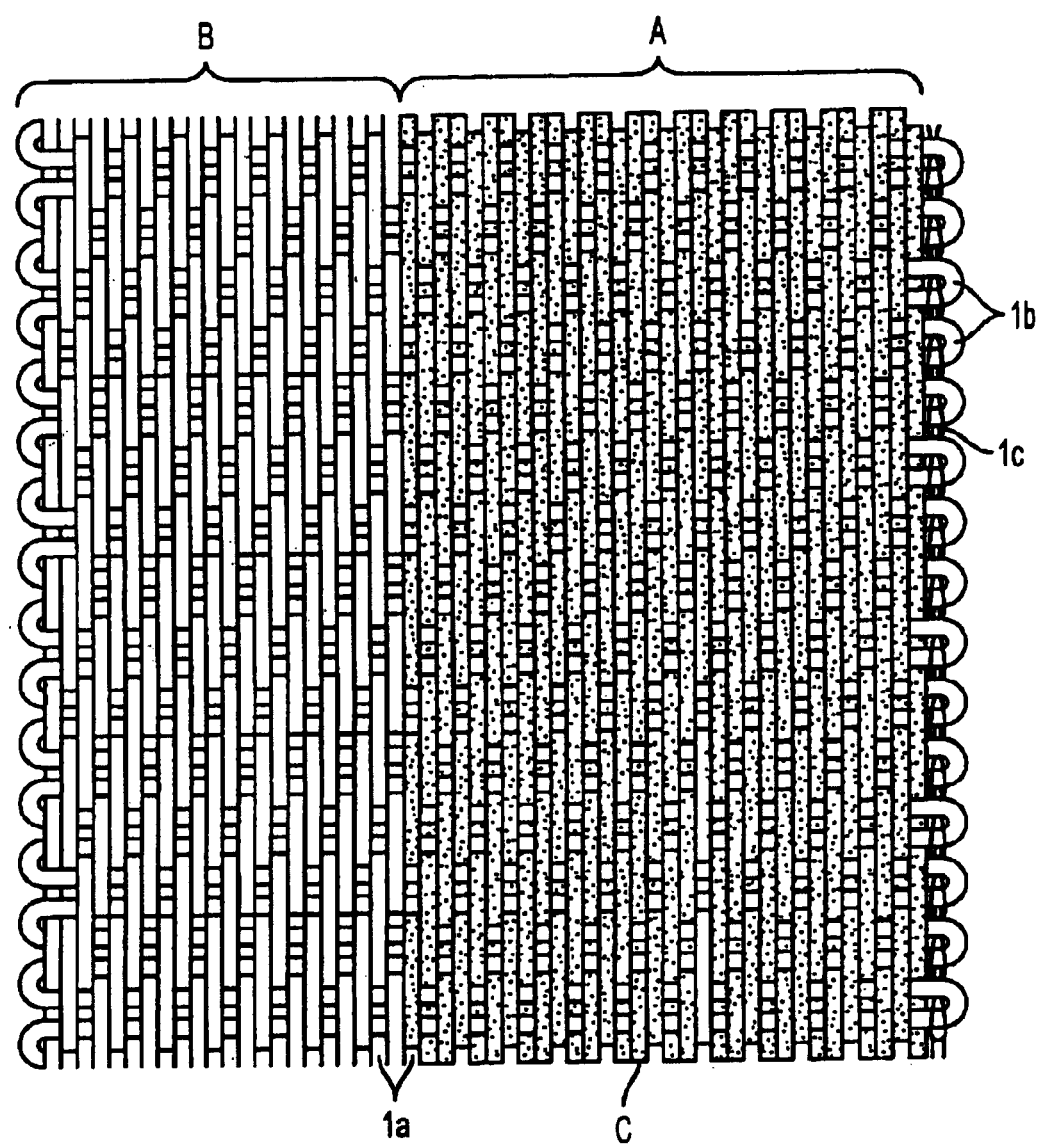
FIG. 1 is a plan view showing a fabric for welding.
Figure 2:
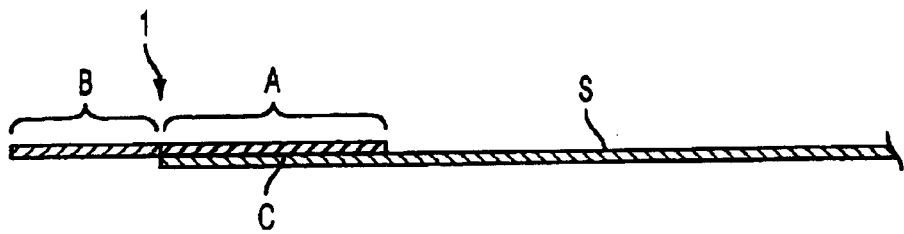
FIG. 2 is a sectional view showing how the fabric for welding in FIG. 1 is welded to a sheet.

Referring to FIG. 1, the fabric for welding 1 is in the form of a belt which is twill-woven from warp 1a and weft 1b using a needle loom. In this embodiment, one side of the fabric for welding is reinforced by chain-knitting an edge thread 1c.

The belt-form fabric for welding 1 is divided widthwise into a welding portion A and a fixing portion B. The warp 1a in the welding portion A is coated with a thermoplastic synthetic resin such as PVC. In this embodiment, only the warp 1a is coated. However, the weft 1b may also be coated, or may be coated instead of the warp 1a, as long as this coating does not adversely affect weaving of the fabric.

When the welding portion A of the fabric for welding 1 is overlapped on the fringe of a substrate S and hot-pressed, the thermoplastic resin around warp 1a melts and flows around between the substrate S and the welding portion A, adhering welding portion A securely to the surface of sheet 1. As a result, the fabric for welding 1 is perfectly welded with substrate S, thus rigidly uniting both members.

Any type of fiber can be used for warp 1a and weft 1b, including spun yarn, filament yarn, and textured yarn. The yarns can be made of any suitable material for making fabrics, including natural fibers, synthetic fibers, and blends thereof.

Where warp 1a comprises a multi-fiber assembly such as spun yarn, multi-filament yarn, or the like, some of the components of the yarn can be fibers coated with a thermoplastic synthetic resin or can be thermoplastic synthetic fibers per se. The weft 1b can also be composed in the same way as the warp 1a.

Figure 3A:
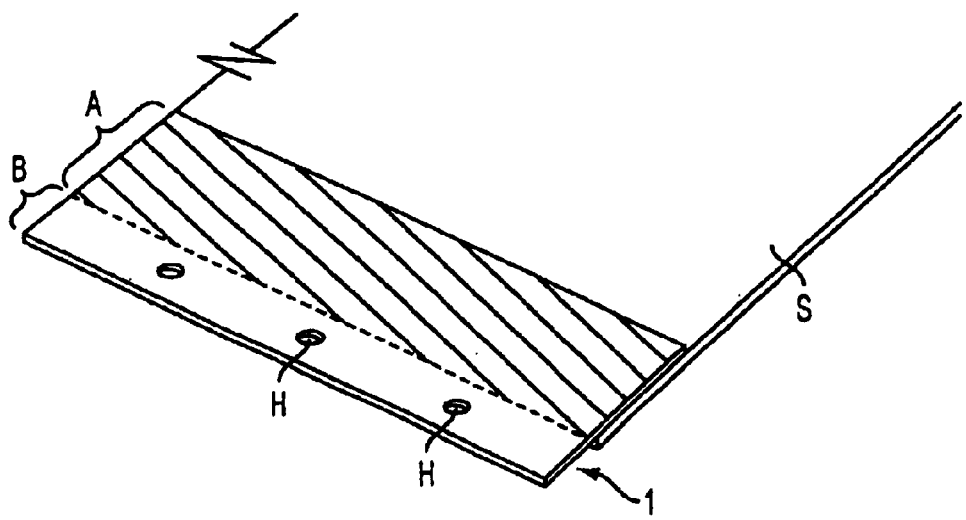
FIG. 3A is a perspective view showing how the fabric can be welded to a substrate.

FIG. 3A shows an embodiment of the present invention in which the fixing portion B of the fabric for welding 1 is provided with auxiliary fixing means. In FIG. 3A, holes H are bored at a suitable interval in the fixing portion B in the fabric for welding 1 to facilitate fixing the unit to another unit or to a column, etc., using a rope or cord or similar device threaded through the holes.

Figure 3B:
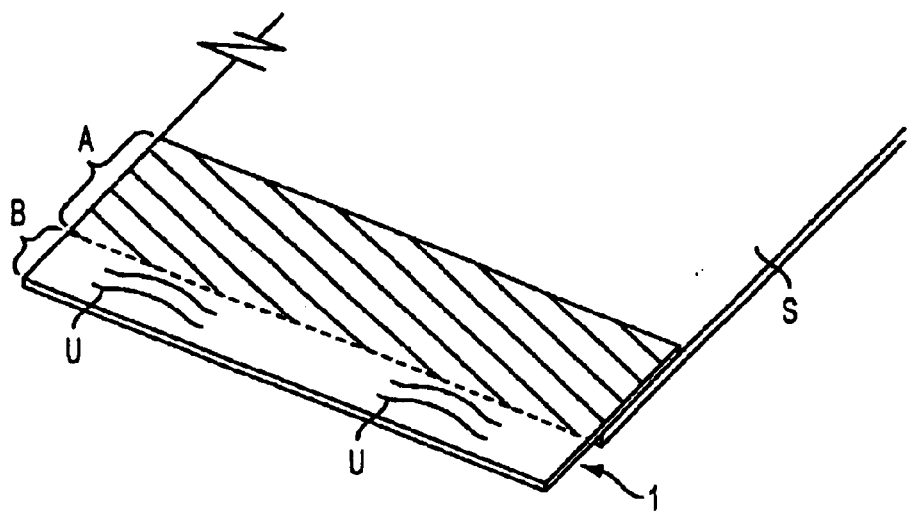
FIG. 3B is another perspective view showing how the fabric can be welded to a substrate.

FIG. 3B provides another example of auxiliary fixing means in the fixing portion B of the fabric for welding 1 is provided with straps U, such as those disclosed by Unexamined Patent Publication H7-207-547.

Figure 4A:
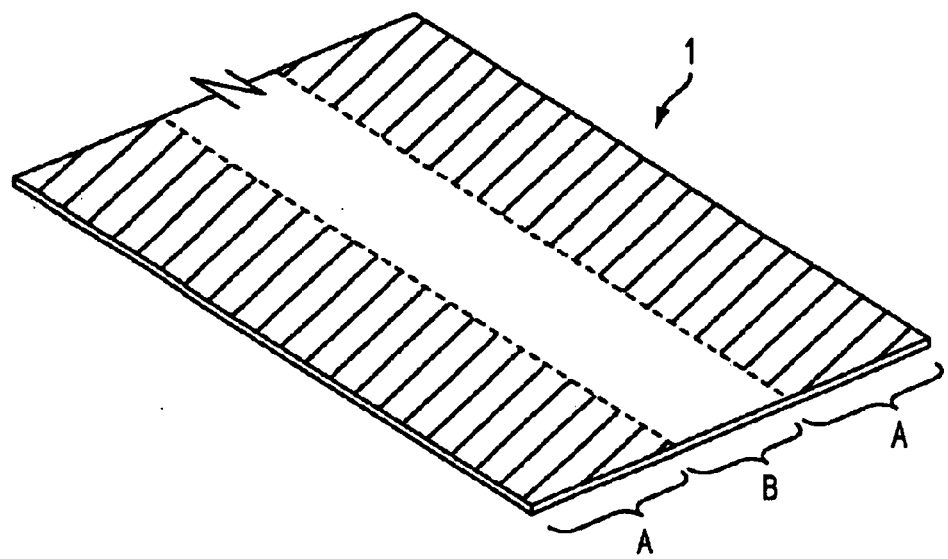
FIG. 4A is a perspective view showing another embodiment of fabric for welding according to the present invention.
Figure 4B:
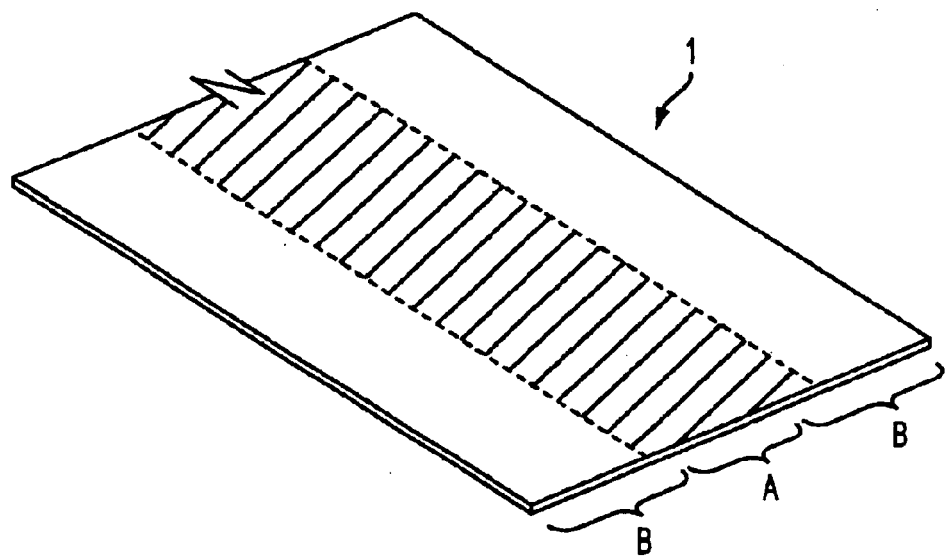
FIG. 4B is another perspective view showing another embodiment of fabric for welding according to the present invention.

In the above examples, a welding portion A is shown on one side of the fabric for welding 1. The welding portion A can be made on both sides of the fabric for welding 1 as shown in FIG. 4A, or can be made the middle part of the fabric, as shown in FIG. 4B. Also, auxiliary fixing means such as straps can also be provided where desired.

Figure 5:
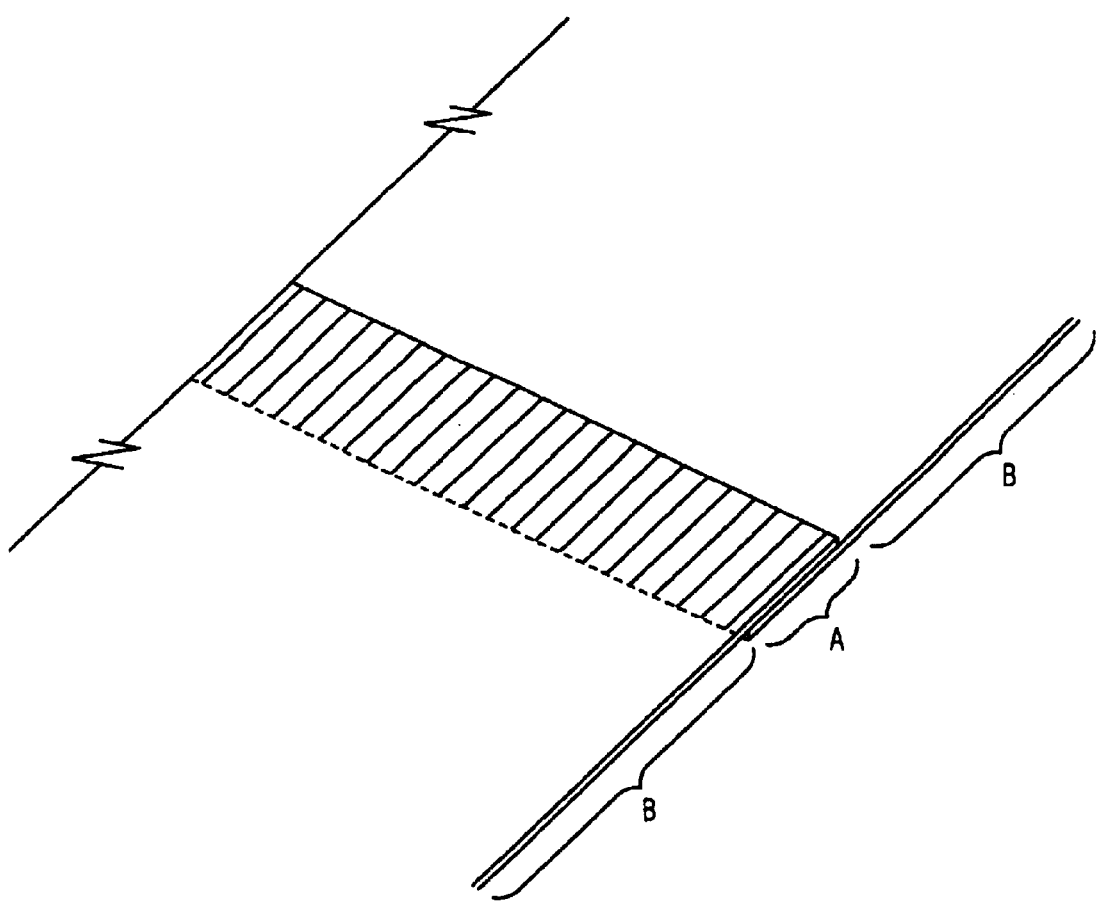
FIG. 5 is a perspective view showing a fabric for welding in another embodiment of the present invention.

In the above examples, the fabric for welding 1 has been in the form of a belt. However, if necessary, the width of the belt can be broadened, and the fixing portion can be extended to that it may completely replace the substrate S. The fabric for welding with an extended fixing portion can be welded with another fabric for welding, as shown in FIG. 5.

Figure 6A:
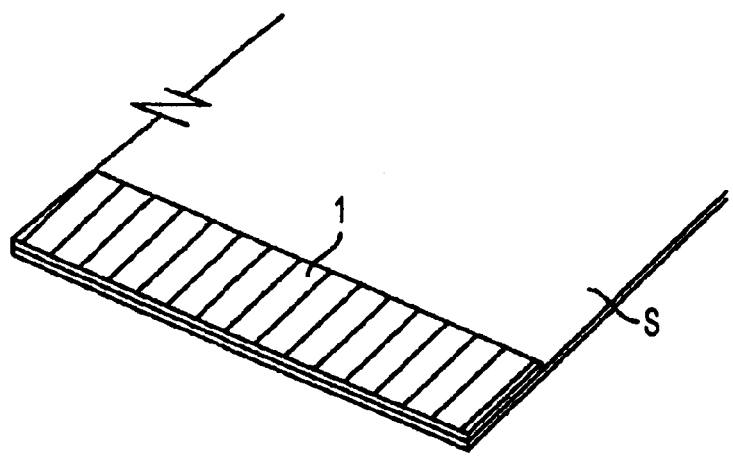
FIG. 6A shows another embodiment of a fabric for welding according to the present invention.

In the examples described so far, the fabric for welding 1 has been divided into a welding portion A and a fixing portion B. However, the entire portion of the fabric for welding 1 can be made as the welding portion A. FIG. 6A illustrates a fabric for welding in which an entire welding portion A is overlapped on the fringe of a substrate S. Optionally, holes (not illustrated) can be bored in this welding portion.

Figure 6B:
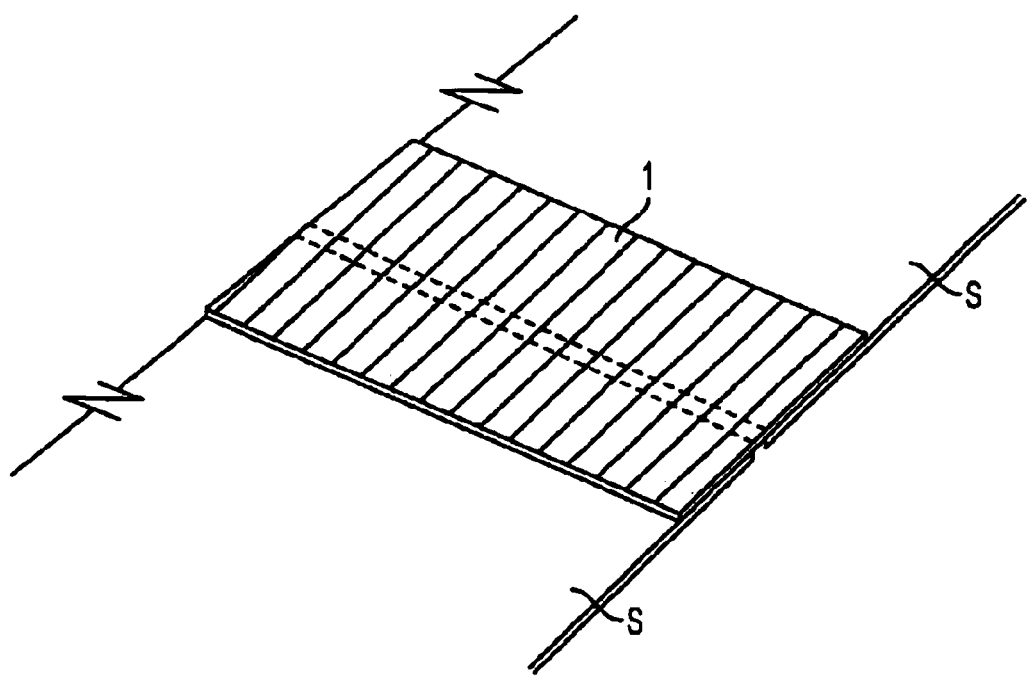
FIG. 6B shows another embodiment of a fabric for welding according to the present invention.

FIG. 6B provides another example where the fabric for welding is connected with two substrates S.

Figure 7A:
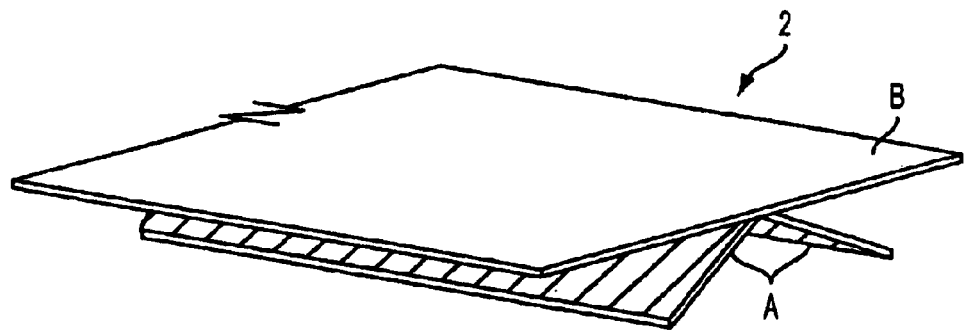
FIG. 7A is a perspective view of one embodiment of the invention as a three-dimensional fabric for welding.
Figure 7B:
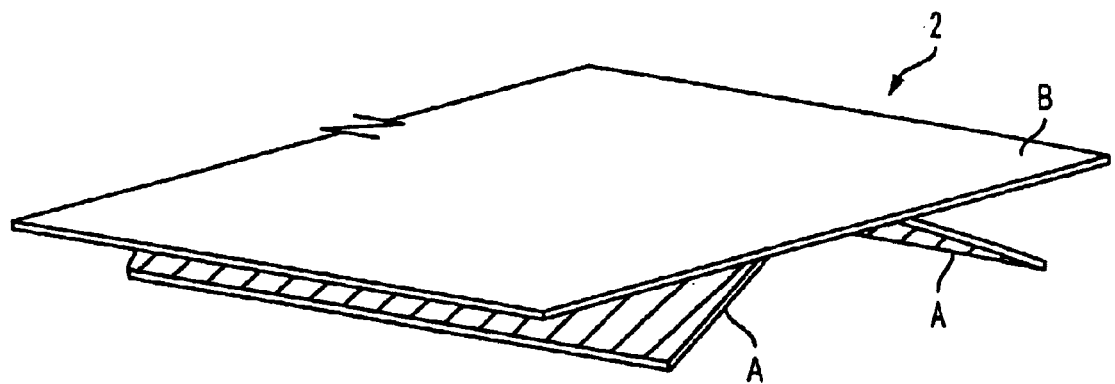
FIG. 7B is a perspective view of another embodiment of the invention as a three-dimensional fabric for welding.
Figure 7C:
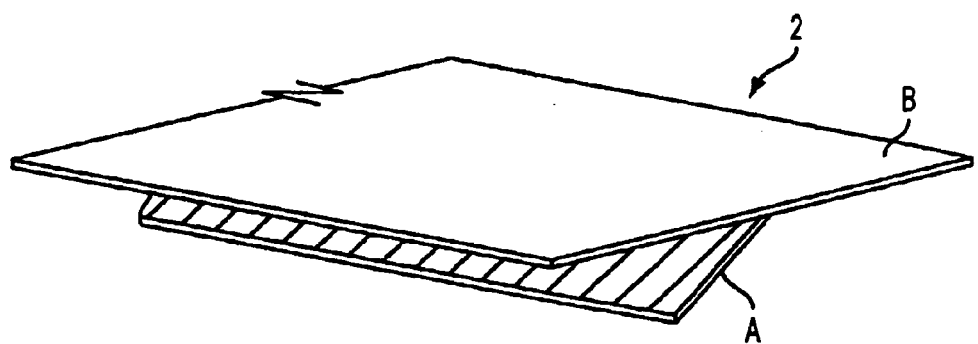
FIG. 7C is a perspective view of another embodiment of the invention as a three-dimensional fabric for welding.

FIGS. 7A–C illustrate some three-dimensionally woven fabrics for welding 1. FIG. 7A shows an example where two welding portions A are branched from the middle line of a belt-form fixing portion B. FIG. 7B shows an example where two welding portions A are each branched from a line just apart from the middle line of a fixing portion B. FIG. 7C illustrates an examples wherein one welding portion A is branched from the middle line of belt-form fixing portion B.

Figure 8A:
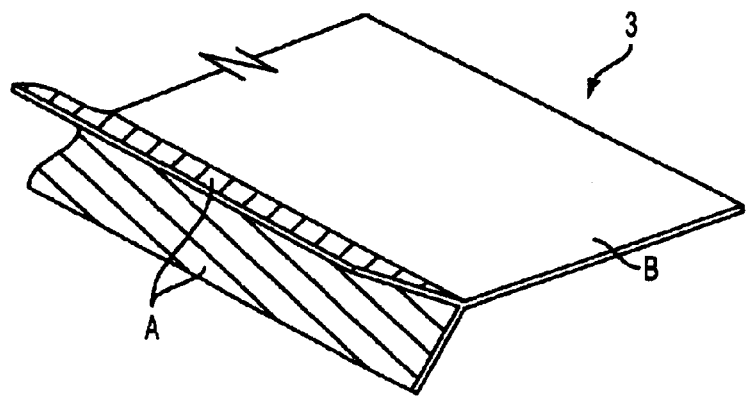
FIG. 8A is a perspective view of another embodiment of the invention as a three-dimensional fabric for welding.
Figure 8B:
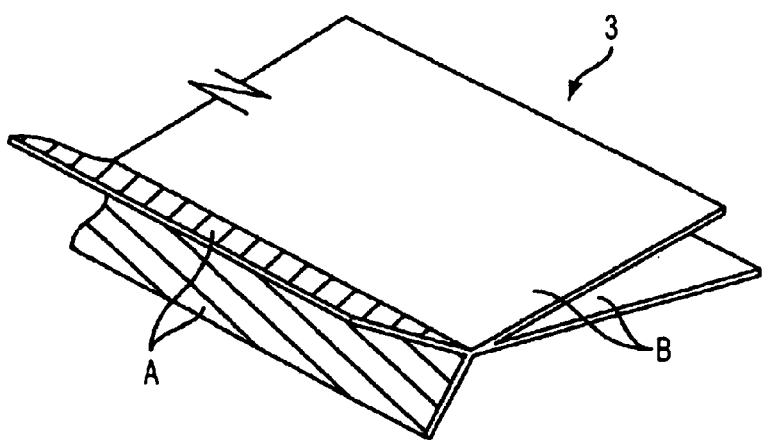
FIG. 8B is a perspective view of another embodiment of the invention as a three-dimensional fabric for welding.
Figure 8C:
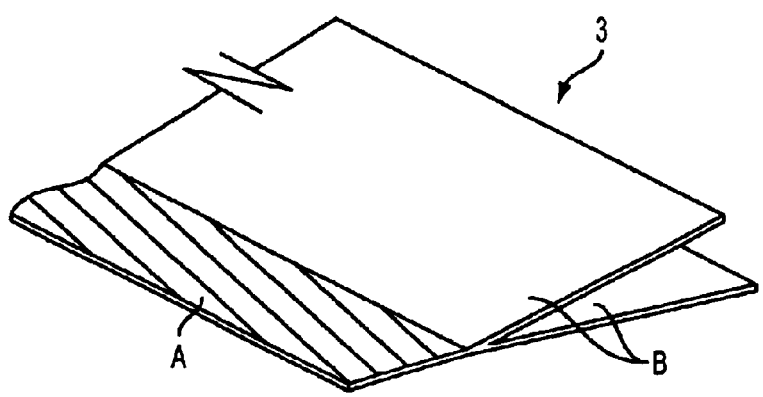
FIG. 8C is a perspective view of another embodiment of the invention as a three-dimensional fabric for welding.
Figure 9A:
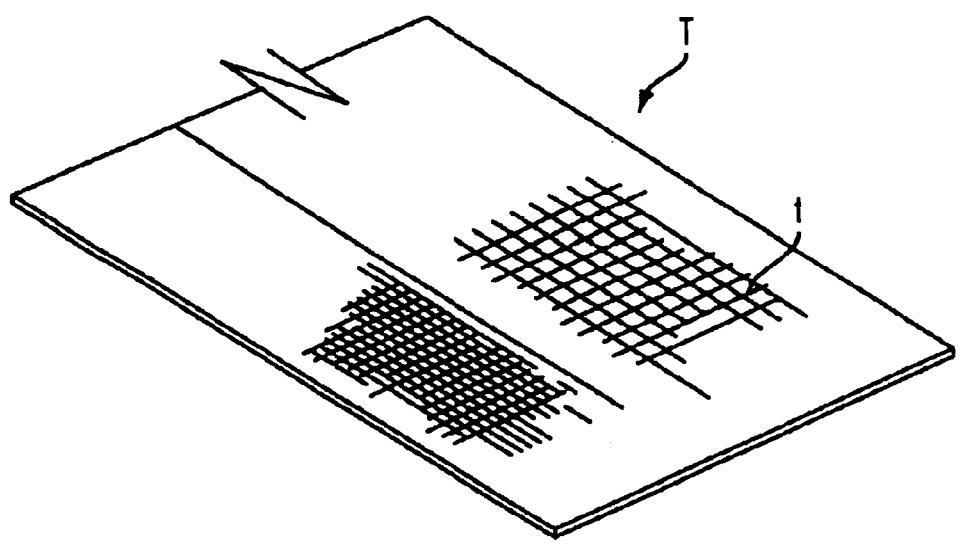
FIG. 9A shows a conventional belt-form fabric for welding.
Figure 9B:
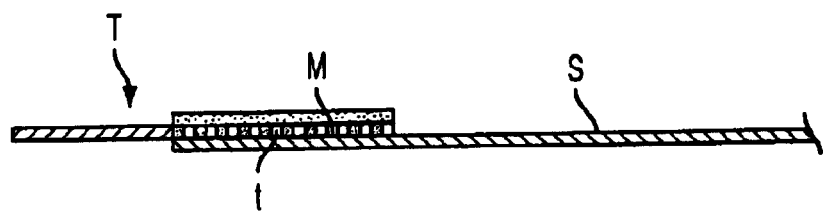
FIG. 9B illustrates how the fabric of FIG. 9A is welded to a substrate.

FIGS. 8A–C illustrate other varieties of three-dimensional fabrics or welding 3. FIG. 8A shows a case in which two welding portions A are branched from one edge of a belt-form fixing portion B. FIG. 8B shows a case in which two fixing portions B are connected edge-to-edge with each other, and two welding portions A are branched therefrom. FIG. 8C illustrates a case in which two fixing portions B are connected edge-to-edge with each other, and a single welding portion A is branched therefrom. The three-dimensional weaves in FIGS. 8B and 8C have the same basic construction as those shown in FIG. 7A and FIG. 7C, respectively, but they differ in the mode of the weave. The weave compositions of the three-dimensional fabrics in FIGS. 7A–C and FIGS. 8A–C are described in detail in the specification of Japanese Patent Application H8-91782.

In a fabric for welding according to the present invention, the fabric has a welding portion and a fixing portion thereon. The welding portion uses at least a warp or a weft coated with a thermoplastic material, or a warp or a weft comprising a fiber coating with a thermoplastic material. Therefore, the fabric for welding of the present invention can be used for easy and perfect welding to substrates.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

All patents and other references cited herein are hereby incorporated by reference in their entirety.

FIGURE REFERENCES 1 fabric for welding
1a warp
1b weft
1c edge thread
2 fabric for welding
3 fabric for welding
A welding portion
B fixing portion
C coated part
H hole
S substrate
T belt-form fabric
t coarsely woven part
U strap

What is claimed is:

1. A woven fabric in belt form and having a welding portion for hot-melt welding the woven fabric to a sheet, for enabling attachment of said sheet to a column, a stake, a log, a building, or a footing, or for connecting the sheet with another sheet, wherein at least the warp of said welding portion completely or partially consists of fibers made from or coated with a thermoplastic synthetic resin.

2. The woven fabric according to claim 1 wherein the thermoplastic synthetic resin is PVC.

3. The woven fabric according to claim 1 wherein at least said warp comprises a spun yarn, a filament yarn, or a textured yarn.

4. The woven fabric according to claim 2 wherein at least said warp comprises a spun yarn, a filament yarn, or a textured yarn.

5. The woven fabric according to claim 4 wherein said yarn comprises natural fibers, chemical fibers, or a blend thereof.

6. The woven fabric according to claim 5, wherein at least some of the fibers either consist of or are coated with said thermoplastic synthetic resin.

7. The woven fabric according to claim 1 wherein, in addition to the warp, the waft, and, optionally, an edge thread, completely or partially consists of fibers made from or coated with said thermoplastic synthetic resin.

8. The woven fabric according to claim 1 wherein the welding portion occupies only a side or an intermediate portion of said fabric.

9. The woven fabric according to claim 1 wherein said welding option joins a flat or folded fixing portion of said fabric.

10. The woven fabric according to claim 9 wherein said welding portion itself is folded.

11. The woven fabric according to claim 9 wherein said welding portion consisting of a plurality of sections branched from said fixing portion along straight lines.

* * * * *